(12) United States Patent
Kelly

(10) Patent No.: US 7,829,611 B2
(45) Date of Patent: Nov. 9, 2010

(54) CURABLE COMPOSITION

(75) Inventor: Michael D. Kelly, North Wales, PA (US)

(73) Assignee: Rohm and Haas Company, Phila., PA (US)

( * ) Notice: Subject to any disclaimer, the term of this patent is extended or adjusted under 35 U.S.C. 154(b) by 322 days.

(21) Appl. No.: 11/820,357

(22) Filed: Jun. 19, 2007

(65) Prior Publication Data

US 2008/0051539 A1    Feb. 28, 2008

Related U.S. Application Data

(60) Provisional application No. 60/839,851, filed on Aug. 24, 2006.

(51) Int. Cl.
*C08L 89/00* (2006.01)

(52) U.S. Cl. .............................. 524/17; 524/15; 524/18; 524/20; 524/26; 524/28; 524/32; 524/35; 524/47; 524/52; 524/55

(58) Field of Classification Search ................... 524/15, 524/17, 20, 26, 28, 32, 35, 47, 55, 18, 52
See application file for complete search history.

(56) References Cited

U.S. PATENT DOCUMENTS

| | | | |
|---|---|---|---|
| 4,076,917 A | 2/1978 | Swift et al. | |
| 4,948,647 A | 8/1990 | Burkard | |
| 5,025,746 A | 6/1991 | Boulter | |
| 5,629,416 A | 5/1997 | Neigel et al. | |
| 5,895,804 A | 4/1999 | Lee et al. | |
| 6,071,994 A * | 6/2000 | Hummerich et al. | 524/247 |
| 6,299,936 B1 | 10/2001 | Reck et al. | |
| 6,838,163 B2 | 1/2005 | Smith et al. | |
| 6,878,321 B2 | 4/2005 | Hauber et al. | |
| 7,026,390 B2 | 4/2006 | O'Brien-Bernini et al. | |
| 7,199,179 B2 * | 4/2007 | Clamen et al. | 524/560 |
| 7,399,818 B2 * | 7/2008 | Bromm et al. | 526/317.1 |
| 2004/0254825 A1 | 12/2004 | Hsu et al. | |
| 2005/0221705 A1 | 10/2005 | Hitch | |
| 2005/0233657 A1 | 10/2005 | Grove et al. | |
| 2005/0261404 A1 | 11/2005 | Rivers et al. | |
| 2006/0029786 A1 | 2/2006 | Wang et al. | |
| 2006/0111480 A1 * | 5/2006 | Hansen et al. | 524/27 |
| 2007/0010651 A1 * | 1/2007 | Finch et al. | 528/310 |
| 2007/0012414 A1 | 1/2007 | Kajander et al. | |
| 2007/0059513 A1 | 3/2007 | Yu et al. | |
| 2007/0148430 A1 | 6/2007 | Agrawal | |

FOREIGN PATENT DOCUMENTS

| | | |
|---|---|---|
| EP | 0 512 732 B1 | 9/1998 |
| EP | 0 911 361 | 4/1999 |
| EP | 1 382 642 A1 | 1/2004 |
| EP | 1 801 278 A1 | 6/2007 |
| WO | WO 2004/083311 A | 9/2004 |

OTHER PUBLICATIONS

Yeon-Hum Yun et al, "Mechanical Properties with the Functional Group of Additives for Starch/PVA Blend Film",Journal of Polymers and the Enviroment,vol. 14,No. 1,Jan. 2006;pp. 72-78.

* cited by examiner

*Primary Examiner*—David Wu
*Assistant Examiner*—Marie Reddick
(74) *Attorney, Agent, or Firm*—Andrew EC Merriam

(57) ABSTRACT

A curable binder composition comprising an emulsion polymer, an extender and a hydryoxyamide.

10 Claims, No Drawings

CURABLE COMPOSITION

This application claims the benefit of priority under 35 U.S.C. §119(e) of U.S. Provisional Patent Application No. 60/839,851, filed on Aug. 24, 2006.

This invention is a curable composition useful as a thermosetting binder for a variety of applications, particularly for substrates that need to retain at least some flexibility.

Curable compositions containing little or no formaldehyde are highly desirable in a variety of products, due to the health and environmental problems associated with formaldehyde. Existing commercial formaldehyde-free binders contain a carboxylic acid polymer and a polyol that esterify and form a thermoset when heat cured. Commercial binders have typically been designed to afford a binder that when cured is substantially rigid. For example, in fiberglass insulation binders, the cured binders must allow the insulation to be compressed, but have rigidity that allows the compressed insulation to recover substantially to its original shape once compressive forces are removed. This allows, for example, the insulation to be shipped in a rolled, compressed state and unrolled before installation to release the compression, and allow a fluffy, heat-insulating mat to be installed.

However, for other applications, the rigid binders of the type described above are undesirable. For example, in thin fiberglass or polyester mats that are to be used in roofing, the mat must be held together with a binder that allows the mat to flex substantially after the binder is cured, to allow the mat to be processed further (e.g., to convert mat into roofing material), and allow the end product containing the mat to flex well in use. For example, in roofing mat, the end roofing product may be impregnated or layered with asphaltic materials, and the resultant roofing product must retain flexibility to allow it to conform to the roof (e.g., bend over peaks and into valleys), and to allow the roofing material to expand and contract with temperature fluctuations, without the mat itself fracturing because it is too brittle and lacks flexibility.

U.S. Pat. No. 5,895,804 discloses a starch-based thermosetting binder with soluble polycarboxy polymers. However, given that soluble polymers have a relatively high acid monomer content, these types of binders tend to be stiff and unsuitable for flexible substrates.

Other applications where curable, formaldehyde-free binders that are "flexible" in this regard include paper, cellulosics, polyester, glass mat, and glass veil. Such substrates are used in a variety of applications, including flooring underlayments, filtration media, and building products.

This invention is a formaldehyde-free binder that retains flexibility after cure.

This invention is a binder composition comprising:
a. at least one polycarboxy emulsion copolymer having from 5-40% by weight of a carboxy acid monomer in the copolymer;
b. at least one hydroxyamide crosslinker having at least two hydroxy groups;

at least one extender selected from the group consisting of a polysaccharide or a vegetable protein, or mixtures thereof, the extender being present in a weight percent on total composition binder solids from 5-70%. Other aspects of this invention are discussed below.

The emulsion copolymer used in the binder of this invention includes, as copolymerized units, from 5% to 40%, preferably from 10% to 30%, most preferably 10 to 20%, by weight based on the weight of the emulsion copolymer solids, a carboxy monomer bearing a carboxylic acid group, anhydride group, or salt thereof or hydroxyl-group, such as (meth) acrylic acid and hydroxyethyl(meth)acrylate. Ethylenically unsaturated carboxylic acid monomer include, for example, methacrylic acid, acrylic acid, crotonic acid, fumaric acid, maleic acid, 2-methyl maleic acid, itaconic acid, 2-methyl itaconic acid, a,b-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof. Acrylic acid is the preferred carboxy monomer.

Ethylenically unsaturated co-monomers useful in the polycarboxy emulsion copolymer include acrylic ester monomers such as methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; (meth)acrylamide or substituted (meth)acrylamides; styrene or substituted styrenes; butadiene; vinyl acetate or other vinyl esters; acrylonitrile or methacrylonitrile; and the like.

Chain transfer agents such as mercaptans, polymercaptans, and halogen compounds can be used in the polymerization mixture in order to moderate the molecular weight of the copolymer composition. Generally, from 0% to 10% by weight, based on the weight of the polymeric binder, of $C_4$-$C_{20}$ alkyl mercaptans, mercaptopropionic acid, or esters of mercaptopropionic acid, can be used.

Low levels of multi-ethylenically-unsaturated monomers can be used in order to produce low levels of precrosslinking, such as, for example, allyl methacrylate, diallyl phthalate, 1,4-butylene glycol dimethacrylate, 1,6-hexanedioldiacrylate, and the like, at a level of from 0.01% to 5%, by weight based on the weight of copolymer.

Preferably, the emulsion copolymer used in this invention has a Tg of between 0-35° C. for non-treated substrates having an inherent elongation of greater than 5%, such as spunbond polyester; and between 35-70° C. for non-treated substrates having an inherent elongation of less than 5%, such as glass mat, as measured by differential scanning calorimetry per ASTM 3418/82, midpoint temperature; cell calibration using an indium reference for temperature and enthalpy.

The emulsion copolymer used in this invention has weight average molecular weight of between 5,000 to 1,000,000, preferably between 20,000 and 750,000, most preferably between 30,000 and 600,000.

The emulsion polymer preferably comprises about 20%-80% weight percent of the total solids in the binder, preferably 30%-50%.

Useful hydroxyamides for this invention include those described in Swift U.S. Pat. No. 4,076,917, and Arkens EP Patent No. 0,512,732. bis[N,N-di(.beta-hydroxyethyl)adipamide is an example.

Preferred hydroxamides are one or more reactive β-hydroxyamide group-containing polyol of the following formula (I),which is the reaction product of a lactone or other cyclic ester and an alkanolamine:

(I)

in which formula, R and R" independently represent H, or any monovalent $C_1$ to $C_{18}$ linear or branched alkyl, which alkyl may comprise one or two aryl or cycloalkyl groups, or be substituted with one or more hydroxyl, amine, thiol, amide, carboxyl or alkenyl groups, or combinations thereof; R' represents either a covalent bond or a divalent $C_1$ to $C_5$ alkylene radical where the alkylene radical may bear alkyl group substituents; y is the integer 1 or 2; x is 0 or 1, such that (x+y)=2;

The reactive β-hydroxyamide group containing polyol (iii) comprises the reaction product of one or more alkanolamine with one or more lactone or lactide. Suitable alkanolamines may comprise mono- or di-ethanolamines, as well as any $C_1$ to $C_{18}$ linear or branched α-alk(en)yl substituted mono- or di-ethanolamines, wherein the alk(en)yl substituent may contain aryl, cycloalkyl and alkenyl groups. Examples of substituted alkanolamines may comprise mono- or di-isopropanolamines and other mono-(1-alk(en)yl)ethanol amine or di-(1-alk(en)yl)ethanol amine. Suitable lactones may comprise lactides, glycolides, and lactones of any $C_2$ to $C_8$ hydroxycarboxylic acids, as well as dimers and oligomers thereof. Preferred lactones include any comprising 5 to 7 membered rings, such as ϵ-caprolactone, γ-butyrolactone and any α-$C_1$ to $C_{18}$ alk(en)yl monosubstituted forms thereof, such as α-methyl-ϵ-caprolactone or α-methyl-γ-butyrolactone.

The reactive β-hydroxyamide group containing polyol (I) may be produced by simple mixing of the lactone and alkanolamine reactants, and, if needed, heating, such as when reacting dimers or oligomers of lactones. Preferably, the reactive β-hydroxyamide group containing polyol(s) (I) are produced in a "dry" or anhydrous mixture of the reactants.

Desirable β-hydroxyamide polyols can be produced by reaction of lactones or lactides with alkanolamines. Specific, non-limiting, examples of this reaction are the reaction of either caprolactone or butyrolactone with diethanolamine to form their corresponding β-hydroxyamide products. No highly volatile organic by-products are formed by this reaction. Potential by-products, including the acid generated by hydrolysis of the lactone if non-anhydrous conditions are used and un-reacted diethanolamine, can cure into the thermoset network. Accordingly, the curable compositions of the present invention resist exuding from substrates treated with them.

The hydroxyamide preferably comprises about 1%-30% weight percent of the total solids in the binder, preferably 5%-15%.

The polysaccharides useful in the binder of this invention include those selected from the group consisting of starch, cellulose, gums, alginates, pectin, gellan and modifications or derivatives thereof which are provided by etherification, esterification, acid hydrolysis, dextrinization, oxidation or enzyme treatment. Such polysaccharides can be derived from natural products, including plant, animal and microbial sources. Examples of polysaccharides include starch, cellulose, gums such as guar and xanthan, alginates, pectin and gellan. Polysaccharide starches include maize or corn, waxy maize, high amylose maize, potato, tapioca and wheat starches. Other starches include varieties of rice, waxy rice, pea, sago, oat, barley, rye, amaranth, sweet potato, and hybrid starches available from conventional plant breeding, e.g., hybrid high amylose starches having amylose content of 40% or more, such as high amylose corn starch. Also useful are genetically engineered starches such as high amylose potato and potato amylopectin starches.

The polysaccharides may be modified or derivatized, such as by etherification, esterification, acid hydrolysis, dextrinization, oxidation or enzyme treatment (e.g., with alpha-amylase, beta-amylase, pullulanase, isoamylase, or glucoamylase), or bio-engineered. Hydroxyethylated corn starch is preferred.

The polysaccharide used in this inventive binder composition can have a weight average molecular weight of less than 10,000. However, it preferably has a weight average molecular weight of at least 10,000 and preferably is 100,000 or more (e.g. as high as 1,000,000 or even as high as 10,000,000). Weight average molecular weight of the polysaccharide is measured using gel permeation chromatography with laser light scattering.

Vegetable protein can also be used as an extender in this invention. A particularly preferred protein extender is soy protein. The vegetable "protein" material can be in the form of ground whole beans (including the hulls, oil, protein, minerals, etc.), a meal (extracted or partially extracted), a flour (i.e., generally containing less than about 1.5% oil and about 30-35% carbohydrate), or an isolate (i.e., a substantially pure protein flour containing less than about 0.5% oil and less than about 5% carbohydrate). As used herein, "flour" includes within its scope material that fits both the definitions of flour and isolate. Preferably, the vegetable protein is in the form of a protein flour, at least because the binder and related fiber mat products produced from the binder made with a flour, as opposed to a meal, have more desirable physical properties.

Any source of soy protein (such as soybean flour or soybean meal) is suitable for use as the binder modifier in the present invention. Protein-rich soybean-derived flours, such as soy protein isolate, protein concentrate and ordinary defatted soy flour, which contain in the range of about 20-95% protein, should each be suitable. Of these, ordinary soy flour is the most abundant and cost-effective. The source of soy protein is preferably essentially free of functional urease. Information on soy protein can be found in, for example, Kirk-Othmer, Encyclopedia of Chemical Technology, Fourth Edition, Volume 22, pp. 591-619 (1997).

Other vegetable-like proteins useful as the extender in this invention, in addition to soy and corn vegetable protein include, to the extent they contain protein, flours made from other varieties of other leguminous beans and seeds, such as sunflower and rape-seeds.

Preferably, the vegetable protein has a particle size (as determined by the largest dimension) of less than about 0.1 inch (0.25 cm), and more preferably less than about 0.05 inch (0.125 cm). If the particle size is much larger than this, the protein material may not be sufficiently soluble or dispersible to produce a binder suitable for making fiber mats with optimum properties. As a consequence, the resultant fiber mats may have lessened tensile properties and less visual asthetics. In those embodiments where the protein is blended with the resin before application to the fiber mat, the time required to solubilize the material tends to be undesirably longer with larger particles. Alternatively, if the protein is applied to the wet-laid mat separate from the remaining components of the binder, one may not get a smooth, asthetically acceptable cured mat using larger sized particles.

For these reasons, a protein flour is more preferred because of its generally smaller particle size distribution. That is, the most preferred ground vegetable protein has a maximum particle size of that of a flour, i.e., about 0.005 inch (0.013 cm). There does not appear to be a minimum particle size requirement for the ground vegetable protein; however, the particle size of commercially available soybean flour is generally less than about 0.003 inch (0.008 cm). For example, in some commercially available soybean flour, greater than about 92% passes through a 325 mesh screen, which corresponds to a particle size of less than about 0.003 inch (0.008 cm). Thus, a wide range of soy flours are expected to be suitable, such as a flour having at least 90 to 95% of its particles smaller than 100 mesh, smaller than 200 mesh, or smaller than 400 mesh.

The extender (whether it is polysaccharide or vegetable protein) preferably comprises about 5%-70% weight percent of the total solids in the binder, preferably 20%-50%, most preferably 40%-50%.

The binder of this invention can optionally include a soluble addition (co)polymer, containing at least two carboxylic acid groups, anhydride groups, or salts thereof. Ethylenically unsaturated carboxylic acids such as, for example, methacrylic acid, acrylic acid, crotonic acid, fumaric acid, maleic acid, 2-methyl maleic acid, itaconic acid, 2-methyl itaconic acid; ethylenically unsaturated anhydrides such as, for example, maleic anhydride, itaconic anhydride, acrylic anhydride, and methacrylic anhydride; and salts thereof, at a level of at least 70% by weight based on the weight of the addition (co)polymer, may be used. Additional ethylenically unsaturated monomer may include acrylic ester monomers, including methyl (meth)acrylate, ethyl (meth)acrylate, butyl (meth)acrylate, 2-ethylhexyl acrylate, etc.

The soluble addition (co)polymer containing at least two carboxylic acid groups, anhydride groups, or salts thereof may have a molecular weight from about 1,000 to 150,000.

The soluble addition (co)polymer containing at least two carboxylic acid groups, anhydride groups, or salts thereof may be used at a level from 0%-30% by weight based on the total weight of the polycarboxy emulsion copolymer.

In one embodiment of the invention, the composition further contains at least one low molecular weight polybasic carboxylic acid, anhydride or salt thereof having a molecular weight of 1000 or less, preferably 500 or less, and most preferably 200 or less. "Polybasic" means having at least two reactive acid or anhydride functional groups. Examples of suitable low molecular weight polybasic carboxylic acids and anhydrides include, for example, maleic acid, maleic anhydride, fumaric acid, succinic acid, succinic anhydride, sebacic acid, azelaic acid, adipic acid, citric acid, glutaric acid, tartaric acid, itaconic acid, trimellitic acid, hemimellitic acid, trimesic acid, tricarballytic acid, 1,2,3,4-butanetetracarboxylic acid, pyromellitic acid, oligomers of carboxylic acid, and the like. Preferably, the low molecular weight polybasic carboxylic acid, anhydride or salt thereof is pre-cooked, under reactive conditions, with the polysaccharide or vegetable protein, prior to mixing with the polycarboxy emulsion copolymer. Most preferably, citric acid is used as the polybasic acid, and hydroxyethylated corn starch is used as the polysaccharide.

In the binder of this invention, the ratio of the total carboxy (COOH) equivalents (from the emulsion polymer and from the soluble (co)polymer and from the polybasic carboxylic acid, if present) to the hydroxy equivalents contributed by the hydroxyamide is preferably 1/0.25-1/5, and more preferably 1/0.50-1/3.

The binder of this invention can contain, in addition, conventional treatment components such as, for example, emulsifiers; pigments; fillers or extenders; anti-migration aids; curing agents; coalescents; surfactants, particularly nonionic surfactants; spreading agents; mineral oil dust suppressing agents; biocides; plasticizers; organosilanes; anti-foaming agents such as dimethicones, silicone oils and ethoxylated nonionics; corrosion inhibitors, particularly corrosion inhibitors effective at pH<4 such as thioureas, oxalates, and chromates; colorants; antistatic agents; lubricants; waxes; antioxidants; coupling agents such as silanes, particularly Silquest™ A-187 (manufactured by GE Silicones—OSi Specialties, located in Wilton Conn.); polymers not of the present invention; and waterproofing agents such as silicones and emulsion polymers, particularly hydrophobic emulsion polymers containing, as copolymerized units, greater than 30% by weight, based on the weight of the emulsion polymer solids, ethylenically-unsaturated acrylic monomer containing a C5 or greater alkyl group.

Additionally, this invention includes methods for treating substrates comprising: Forming the wet, uncured web of fibers, and preferably transferred to a moving screen running through a binder application station where the aqueous binder of the invention is applied to the mat. The binder can be applied to the structure by any suitable means including, for example, air or airless spraying, padding, saturating, roll coating, curtain coating, beater deposition, coagulation or dip and squeeze application, and the resultant saturated wet bindered web laying on a supporting wire or screen is run over one or more vacuum boxes to remove enough binder to achieve the desired binder content in the mat. The binder level in the inventive mats can range from about 10 to about 35 wt. percent of the finished dry mat, preferably about 15 to about 30 wt. percent and most preferably from about 20 to about 30 wt. percent, such as about 25+/−3 wt. percent. The binder composition is curable by the application of heat, i.e., the binder composition is a thermosetting composition. As used herein, the phrase "alkyl" means any aliphatic alkyl group having one or more carbon atoms, the alkyl group including n-alkyl, s-alkyl, i-alkyl, t-alkyl groups or cyclic aliphatics containing one or more 5, 6 or seven member ring structures.

As used herein, the phrase "aqueous" or "aqueous solvent" includes water and mixtures composed substantially of water and water-miscible solvents.

As used herein, the phrase "based on the total weight of binder solids" refers to weight amounts of any given ingredient in comparison to the total weight amount of all the non-water ingredients in the binder (e.g., polyacids, emulsion copolymers, polyols and the like). Binders of this invention can be aqueous or dry (with water optionally added prior to application to a substrate).

As used herein, unless otherwise indicated, the word "copolymer" includes, independently, copolymers, terpolymers, block copolymers, segmented copolymers, graft copolymers, and any mixture or combination thereof. (Co) polymer means homopolymer or copolymer As used herein, the phrase "emulsion polymer" means polymers dispersed in an aqueous medium that has been prepared by emulsion polymerization.

As used herein, the phrase "formaldehyde-free composition" refers to compositions substantially free from added formaldehyde, and which do not liberate substantial formaldehyde as a result of drying and/or curing.

As used herein, the term "(meth)acrylate" means acrylate, methacrylate, and mixtures thereof and the term "(meth) acrylic" used herein means acrylic, methacrylic, and mixtures thereof.

As used herein, the phrases "($C_3$-$C_{12}$)—" or "($C_3$-$C_6$)—" and the like refer to organic compounds or structural portions of organic compounds containing 3 to 12 carbon atoms and 3 to 6 carbon atoms, respectively.

As used herein, unless otherwise indicated, the phrase "molecular weight" refers to the weight average molecular weight of a polymer as measured by gel permeation chromatography (GPC). Gel permeation chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84.

The molecular weight information for a low molecular weight sample (e.g., 10,000) is determined as follows: The sample (an aqueous emulsion containing low molecular weight particles) is dissolved in THF at a concentration of approximately 0.1% weight sample per volume THF, and shaken for 6 hours, followed by filtration through a 0.45 μm PTFE (polytetrafluoroethylene) membrane filter. The analysis is performed by injecting 100 μl of the above solution onto 3 columns, connected in sequence and held at 40° C. The three columns are: one each of PL Gel 5 100, PL Gel 5 1,000, and PL Gel 5 10,000, all available from Polymer Labs, Amherst, Mass. The mobile phase used is THF flowing at 1 ml/min. Detection is via differential refractive index. The system is calibrated with narrow polystyrene standards. PMMA-equivalent molecular weights for the sample are calculated via Mark-Houwink correction using $K=14.1\times10^{-3}$ ml/g and a=0.70 for the polystyrene standards and $K=10.4\times10^{-3}$ ml/g and a=0.697 for the sample.

The binders of this invention are useful to bind non-woven webs, among other things. "Non-woven web(s)" refers to any article or sheet-like form made from natural and/or synthetic fibers wherein the fibers are aligned in a random or semi-random order (i.e., not deliberately ordered). One skilled in the art understands that formation of some order occurs during the web forming process (primarily in the machine direction); however, this is completely different from the ordering obtained from traditional weaving or knitting processes. Suitable fibers for use in forming the web include, but are not limited to, fiberglass, cellulose, modified cellulose (cellulose acetate), cotton, polyesters, rayon, polyacrylonitrile (PAN), polylactic acid (PLA), polycaprolactone (PCL), polyolefins and bi-component fiber comprising two or more fiber-forming polymers such as polypropylene and polyethylene terphthalate and the like. Included in the definition of non-woven webs suitable for use with this invention are porous films prepared by the action of chemical or mechanical processing (e.g., apertured films). Also included as useful for the purpose of this invention are paper and paper products. The present invention will find utility with any weight of non-woven web and will depend greatly on the requirements of the particular application. Manufacturing processes for making non-woven webs are well known in the art. These include, for example, wet-laid, air-laid (dry laid), spunbond, spunlace, meltblown and needle punch. Particularly suitable webs will have a base weight (i.e., the weight of the web before any coating or treatments are applied) of less than about 100 grams per square meter (gsm). In another aspect the webs will have a base weight of less than about 20 gsm.

U.S. Patent Publication 20060121099 describes a commercial process for cooking and applying starch to non-wovens that can be employed in practicing this invention. Specifically, the starch can be cooked and spray dried and applied to a non-woven substrate, followed by application of the other binder components of this invention either in aqueous or dried form. After application, the binder can be cured by heating the coated non-woven to a sufficient temperature where it cures on the substrate. As far as cooking the starch, processes such as those described in Papermaking Science and Technology Book 11 Pigment Coating and Surface Sizing of Paper, published by Fapet Oy and printed by Gummerus Printing (2000) pp. 338-340, or other methods of processing starch such as those described in pages 340-343 can be used to used in the practice of this invention. Preferably, when starch is used as the extender in this invention, it is cooked before application onto the substrate, and the other binder ingredients are either mixed with the cooked starch before or after application of the starch to the substrate. Preferably, a jet cooker is employed where the starch is cooked and spray-dried onto the substrate.

Preferably, the binder compositions are formaldehyde-free. To minimize the formaldehyde content of the aqueous composition, it is preferred, when preparing a polymer-containing formaldehyde-free curable composition, to use polymerization adjuncts and additives such as, for example, initiators, reducing agents, chain transfer agents, curing agents, biocides, surfactants, emulsifiers coupling agents, anti-foaming agents, dust suppressing agents, fillers and the like, which are themselves free from formaldehyde, do not generate formaldehyde during the polymerization process, and do not generate or emit formaldehyde during the treatment of heat-resistant nonwovens.

In one embodiment of this invention, the binder composition comprises a phosphorous-containing accelerator such as those disclosed in U.S. Pat. No. 6,136,916. Preferably, the accelerator is selected from the group consisting of sodium hypophosphite, sodium phosphite, or a mixture thereof. The phosphorous-containing accelerator can also be an oligomer bearing phosphorous-containing groups such as, for example, an oligomer of acrylic acid formed in the presence of sodium hypophosphite by addition polymerization, but a separate compound from the any soluble polymer serving as part of the binder of the curable composition of the present invention. The one or more phosphorous-containing accelerator may be used at a level of from 0 wt. % to 40 wt. %, based on the total weight of binder solids. The phosphorous-containing accelerators may be used in the amount of 0.1 wt. % or more, based on the total weight of binder solids, and up to 25 wt. %, or up to 20 wt. %, or, preferably, up to 15 wt. %, and, more preferably, up to 12 wt. %. When the phosphorous-containing accelerator comprises part of an addition (co)polymer or (co)oligomer, the wt. % of the phosphorous-containing accelerator is based on/determined by wt % of hypophosphite, phosphinate or phosphonate charged to the reactor as a fraction of the total solids. Preferably sodium hypophosphite is used, and its weight percent based on total carboxyl acid weight from the emulsion polymer and the soluble polymer (if it is used) is from about 1%-20%, preferably 5%-15%.

In one embodiment, the curable compositions may optionally contain one or more strong acids, wherein the strong acid has a pKa of ≦3.0. The composition may contain up to 0.2 equivalents of a strong acid, relative to the equivalents of total carboxylic acid from the emulsion polymer and the optional soluble polymer, such as from 0.01 to 0.18 equivalents. The strong acid may be a mineral acid, such as, for example, sulfuric acid, or an organic acid, such as, for example, a sulfonic acid. Mineral acids are preferred.

In drying (if applied in aqueous form) and curing the curable compositions, the duration, and temperature of heating, will affect the rate of drying, ease of processing or handling, and property development of the treated substrate. Suitable heat treatment at 100° C. or more, and up to 400° C., may be maintained for from 3 seconds to 15 minutes. Preferably, heat treatment temperatures range 150° C. or higher; such preferred heat treatment temperatures may range up to 225° C., or, more preferably, up to 200° C. or, when using one or more phosphorous-containing accelerator, up to 150° C. Where the substrate contains wood, temperatures of 100° C. to 220° C., are preferred.

Drying and curing can be done in two or more distinct steps, if desired. For example, the curable composition can be first heated at temperatures and for times sufficient to substantially dry, but not to substantially cure the composition, followed by heating for a second time, at higher temperatures and/or for longer periods of time, to effect curing. Such procedures, referred to as "B-staging," can be used to provide binder-treated nonwovens, for example, in roll form, which can be cured later, with or without forming or molding into a particular configuration, concurrent with the curing process.

Suitable substrates include, for example, heat-sensitive substrates, such as wood, including, solid wood, wood particles, fibers, chips, flour, pulp, and flakes; paper and cardboard; textiles, including cotton, linen, wool, and synthetic textiles from polyester, rayon, or nylon, and superabsorbent fibers; vegetable fibers, such as jute, sisal, flax, cotton and animal fibers; as well as heat resistant substrates, such as metal; plastic; fibers, such as glass and mineral fibers, aramid fibers, ceramic fibers, metal fibers, carbon fibers, polyimide fibers, and woven and non-woven fabrics made therefrom. Heat-resistant non-wovens may also contain fibers which are not in themselves heat-resistant such as, for example, polyester fibers, rayon fibers, nylon fibers, and superabsorbent fibers, in so far as or in amounts such that they do not materially adversely affect the performance of the substrate.

Non-woven fabrics are composed of fibers which can be consolidated in whole or in part by mechanical means such as, for example, by entanglement caused by needle-punching, by an air-laid process, and by a wet-laid process; by chemical means such as, for example, treatment with a polymeric binder; or by a combination of mechanical and chemical means before, during, or after nonwoven fabric formation. Some non-woven fabrics are used at temperatures substantially higher than ambient temperature: such as, for example, glass fiber-containing non-woven fabrics which are impregnated with a hot asphaltic composition pursuant to making roofing shingles or roll roofing material. When a non-woven fabric is contacted with a hot asphaltic composition at temperatures of from 150° C. to 250° C., the non-woven fabric can sag, shrink, or otherwise become distorted. Therefore, non-woven fabrics which incorporate a curable composition should substantially retain the properties contributed by the cured aqueous composition such as, for example, tensile strength. In addition, the cured composition should not substantially detract from essential non-woven fabric characteristics, as would be the case, for example, if the cured composition were too rigid or brittle or became sticky under processing conditions.

EXAMPLES

These examples illustrate specific binder compositions of this invention and ones that compare to such compositions Emulsion Polymer Synthesis Examples 1-7

All latex samples were prepared by the same procedure. A 3-liter round-bottom flask equipped with a paddle stirrer, thermocouple, nitrogen inlet, and reflux condenser was charged with a mixture of 780 grams of deionized water, which is heated to 88° C., At temperature, a solution of 1.95 grams of ammonium persulfate dissolved in 13.0 grams of dionized water is charged to the flask with deionized water at temperature. After two minutes, 91.7 grams of a 100 nm latex seed with a solids content of 45% is charged, followed by two minute hold. A monomer emulsion was prepared according to the recipe shown in Table A. After two minutes, and while maintaining a reaction temperature of 88° C., the monomer emulsion and a separate solution of 1.95 grams of ammonium persulfate in 102 grams of deionized water were gradually added over 3 hours. After this addition was complete, the reaction mixture was held at 88° C. for 20 minutes then cooled to 70° C. A solution of 7.8 milligrams of ferrous sulfate heptahydrate in 5.2 grams deionized water was added to the reaction mixture. A solution of 3.64 grams of aqueous tert-butylhydroperoxide (70%) diluted with 18.0 grams deionized water and a solution of 1.82 grams of isoascorbic acid in 19.5 grams of deionized water were gradually added to the reaction mixture over 15 minutes. The reaction mixture was held at 70° C. for an additional 15 minutes then cooled. The resulting latex had a solids content of roughly 39.5%.

TABLE A

Monomer Emulsion Recipes for Latex Samples 1-7 (weights in grams)

| | Example 1 | Example 2 | Example 3 | Example 4 | Example 5 | Example 6 | Example 7 |
|---|---|---|---|---|---|---|---|
| Deionized water | 245.7 | 245.7 | 245.7 | 245.7 | 245.7 | 245.7 | 245.7 |
| Sodium lauryl ether sulfate surfactant, 30% | 6.5 | 6.5 | 6.5 | 6.5 | 6.5 | 6.5 | 6.5 |
| Butyl acrylate | 392.3 | 400.1 | 407.9 | 407.9 | 443.0 | 408.2 | 592.8 |
| Styrene | 348.7 | 301.9 | 255.1 | 255.1 | 142.0 | 254.8 | 70.2 |
| Acrylic acid | 39.0 | 78.0 | 117.0 | 117.0 | 117.0 | 117.0 | 117.0 |
| Allyl methacrylate | | | | 0.8 | | | |
| Acrylonitrile | | | | | 78.0 | | |
| n-DDM | | | | | | 7.8 | 7.8 |

TABLE B

Weight Average Molecular Weights for Latex Samples 1-7

| | Example 1 | Example 2 | Example 3 | Example 4 | Example 5 | Example 6 | Example 7 |
|---|---|---|---|---|---|---|---|
| Molecular Weight, x1000 (DSC) | 344 | 373 | 405 | 245 | 2663 | 36.82 | 47.27 |

Example 8

β-Hydroxyamide #1-Reaction Product Of ε-Caprolactone And Diethanolamine

To a 1L flask equipped with a condenser, a thermocouple, and a mechanical stirrer was added 157.5 grams (1.5 moles) of diethanolamine (DEOA). Starting at room temperature under one atmosphere of nitrogen, and without external heating, 171.2 grams (1.5 moles) of ε-caprolactone was added to the reaction flask by pipette in small aliquots over the course of 1 hour. The reaction mixture exhibited a slight exotherm to 31° C. After the addition of ε-caprolactone was complete, the reaction mixture was stirred for another hour. After that hour, 82.0 grams of deionized water were added yielding an 80% active material.

Example 9

Beta-Hydroxyamide #2-Reaction Product Of γ-Butyrolactone And Diethanolamine

To a 1L flask equipped with a condenser, a thermocouple, and a mechanical stirrer was added 157.5 grams (1.5 moles) of DEOA. Starting at room temperature under one atmosphere of nitrogen, and without external heating 127.9 grams (1.5 moles) of γ-butyrolactone was added to the reaction flask by pipette in small aliquots over the course of 1.5 hours. The reaction mixture exhibited a slight exotherm to 27° C. After the addition of γ-butyrolactone was complete the reaction mixture was stirred for another hour. After that hour 69.8 grams of deionized water were added yielding an 80% active material.

Example 10

Starch Preparation

For the binder samples 1-13 below, the starch is processed as follows. To a one-quart stainless steel container, 490 grams of water is weighed and the container clamped in a water-bath which has been pre-heated and maintained at 85° C. The level of water in the water bath is maintained higher than the level of water in the container. A stirring blade attached to a bench-top stirrer is positioned within the water such that it does not hit the sides or bottom of the container. The stirrer is turned on to a speed sufficient to provide a strong vortex. 210 grams of starch (Penford Gum 290) is weighed into a paper cup, then added slowly to the stirring water. Once at temperature, timing is begun, and the mixture is cooked for 25 minutes at 85° C. After the 25 minute cooking time, the mixture is removed from the water bath. Before adding to the binder formulation, the starch mixture is diluted with room temperature water to about 10-15% solids, and stirred to constant consistency.

Preparation of Binder Samples 1-13[1]

| Sample | g. Emulsion | g. Polyol | g. Polysacch. | g. Accel. | g $H_2O$ |
|---|---|---|---|---|---|
| 1 | 100 Ex. 1 | 4.88 hydroxyamide | 94.67 starch | 0.39 SHP | 509.81 |
| 2 | 100 Ex. 4 | 15.12 hydroxyamide | 116.33 starch | 1.19 SHP | 640.68 |
| 3 | 100 Ex. 1 | 4.88 hydroxyamide | 94.67 dextrin | 0.39 SHP | 509.81 |
| 4 | 100 Ex. 4 | 15.12 hydroxyamide | 116.33 dextrin | 1.19 SHP | 640.68 |
| 5 | 100 Ex. 1 | 0 | 86.00 dextrin | 0.39 SHP | 458.35 |
| 6 | 100 Ex. 4 | 0 | 89.67 starch | 1.19 SHP | 481.51 |
| 7 | 100 Ex. 1 | 4.88 hydroxyamide | 0 | 0.39 SHP | 320.47 |
| 8 | 100 Ex. 4 | 15.12 hydroxyamide | 0 | 1.19 SHP | 408.82 |
| 9 | 100 Ex. 5 | 10.88 hydroxyamide | 128.77 starch | 1.19 SHP | 617.63 |
| 10 | 100 Ex. 2 | 7.86 hydroxyamide | 128.33 starch | 0.86 SHP | 618.44 |
| 11 | 100 Ex. 3 | 5.00 hydroxyamide | 148.93 starch | 0.44 SHP | 639.20 |
| 12 | 100 Ex. 6 | 15.09 hydroxyamide | 123.13 starch | 1.32 SHP | 683.90 |
| 13 | 100 Ex. 7 | 11.99 hydroxyamide | 141.87 starch | 1.31 SHP | 690.61 |

[1]The hydroxyamide is the one from Example 6. The starch is Penford ® Gum 290 hydroxyethylated starch; 30% by weight in water, cooked at 85° C. for 25 minutes prior to addition to formulation. "SHP" is sodium hypophosphite, added as 45% solution by weight in water. The dextrin is maltodextrin, a low molecular weight and readily soluble starch (dextrose equivalent = 10) specifically STAR-DRI ® 100 from A. E. Stanley Mfg.Co.; added as 30% by weight solution in water.

Hot and Room Temperature Tensile Test Results: Samples 1-10, 12-13

| Sample | Hot TS | Hot Width | RT TS | RT Elong. |
|---|---|---|---|---|
| 1 | 56 | 66 | 421 | 44 |
| 2 | 108 | 82 | 413 | 44 |
| 3 | 73 | 70 | 400 | 50 |
| 4 | 96 | 82 | 401 | 43 |
| 5 | 33 | 57 | 437 | 45 |
| 6 | 68 | 64 | 440 | 47 |
| 7 | 74 | 83 | 427 | 46 |
| 8 | 96 | 80 | 423 | 46 |
| 9 | 99 | 84 | 390 | 48 |
| 10 | 71 | 84 | 406 | 47 |
| 12 | 55 | 76 | 391 | 52 |
| 13 | 46 | 73 | 323 | 57 |
| Comp. A | 81 | 89 | 416 | 55 |
| Comp. B | 151 | 83 | 329 | 22 |

Comparative A is a blend of acrylic emulsion and urea formaldehyde resin in a weight ratio of 90/10. Comparative B is a binder; comprised of a soluble polymer of 100% acrylic acid crosslinked with triethanolamine.

The dextrin solution was prepared by solubilizing in water with stirring at 30% solids by weight.

Samples 7-9 that comprise either starch or dextrin incorporate hydroxyamide as the polyol component impart increasing level of Hot Tensile Strength and Hot Width Retention as the emulsion acid level increases.

| Water Uptake Test Results | | | |
|---|---|---|---|
| | Sample 9 | Sample 10 | Comp. A |
| Vertical Height, mm | 3 | 1 | 43 |

Example 11

Starch/Polybasic Acid (Citric) Preparation

For the binder samples 14-15 below, the starch is processed similar to Example 10 above, but a lower molecular weight starch is used, and is cooked together with citric acid to provide reactive sites for starch hydroxyl functionality. To a one-quart stainless steel container, 558.86 grams of water is weighed and the container clamped in a water-bath which has been pre-heated and maintained at 85° C. The level of water in the water bath is maintained higher than the level of water in the container. A stirring blade attached to a bench-top stirrer is positioned within the water such that it does not hit the sides or bottom of the container. The stirrer is turned on to a speed sufficient to provide a strong vortex. 270 grams of starch (Penford Gum 295) is weighed into a paper cup; 30 grans of anhydrous citric acid is weighed into the same cup with the starch. This dry mixture is then added to the stirring water secured in the heated water bath. Once at temperature, timing is begun, and the mixture is cooked for 25 minutes at 85° C. After the 25 minute cooking time, the mixture is removed from the water bath. Before adding to the binder formulation, the starch/citric acid mixture is diluted with room temperature water to about 10-15% solids and stirred to constant consistency.

| Preparation of Binder Samples 14-15[2] | | | | | |
|---|---|---|---|---|---|
| Sample | g. Emulsion | g. Polyol | g. Polysacch. | g. Accel. | g H$_2$O |
| 14 | 100 Ex. 6 | 7.02 hydroxyamide | 153.18 starch | 0.92 SHP | 409.04 |
| 15 | 100 Ex. 6 | 7.02 hydroxyamide | 153.18 starch/citric | 0.92 SHP | 409.04 |

[2]The hydroxyamide is the one from Example 6. The starch is Penford ® Gum 295 hydroxyethylated starch; 35% by weight in water, cooked at 85° C. for 25 minutes prior to addition to formulation. "SHP" is sodium hypophosphite, added as 45% solution by weight in water.

| Hot and Room Temperature Tensile Test Results: Samples 14-16 | | | | |
|---|---|---|---|---|
| Sample | Hot TS | Hot Width | RT TS | RT Elong. |
| 14 | 72 | 71 | 419 | 48 |
| 15 | 51 | 66 | 438 | 52 |

Test Methods:

Mat Preparation:

Commercial polyester spunbond mat (non-treated) is cut into 15"×12" sheets. Sheets are dip coated in test binder formulation at 11% bath solids (by weight). Soaked sheets are padded at 40 psi and then immediately cured at 200° C. for 3 minutes. Binder add-on is about 20% by weight.

An Instron 4201 tensile tester equipped with a 1 kN load cell and an oven chamber encasing the jaws with temperature range of −100 to 400° F. (−73° C. to 204° C.) capability was used for both room temperature (RT) tensile strength and elongation, and high temperature (hot) tensile strength and wide retention.

For RT tensile strength and RT elongation, a cured sheet was cut into 1½"×10" strips. Strips were tested by placing them in the jaws of the tensile tester and pulled apart at a crosshead speed of 8 inches/minute with a 6" gap. The maximum RT tensile strength is measured, and expressed in Newtons. Elongation (strain) is measured at maximum RT tensile strength, and expressed as %.

Hot Tensile Strength and Hot Width Retention

A cured sheet is cut into 2"×12" strips. The oven chamber of the tensile tester is pre-heated to 375° F. (190° C.) prior to testing. Once pre-heated, the strips are placed in the jaws and the oven chamber closed and equilibrated back to 375° F. The samples are then pulled apart at a crosshead speed of 8 inches/minute with an 8" gap. Hot Tensile Strength is measured at 20% elongation (strain), and expressed in Newtons. Hot Width Retention is calculated by measuring the width of the test strip at the narrow point and dividing this by the initial width, expressed as a percent. Hot Width Retention is a measure of the substrate's thermal dimensional stability.

Water Uptake

A mixture of water-soluble dye in water is added to a 1-quart glass jar to a height of 20 mm from the bottom. A 2" by 10" strip of cured sheet is placed lengthwise in the jar. All cured sheets samples are placed at the same angle in the glass jar. The vertical height that the water migrates up the cured sheet is recorded after 48 hours submersion in the water-soluble dye solution.

I claim:

1. A curable binder composition comprising:
   a. at least one polycarboxy emulsion copolymer having, as copolymerized units, from 5-45% by weight of a carboxy monomer based on the weight of emulsion copolymer solids; and
   b. at least one hydroxyamide crosslinker having at least two hydroxy groups;
   at least one extender chosen from a polysaccharide, a vegetable protein, and mixtures thereof, the extender being present in a weight percent, based on total composition binder solids, of from 5-80%,
   wherein the amount of the emulsion copolymer ranges from 30 to 50% by weight, based on total binder solids.

2. The binder composition of claim 1 wherein the carboxy monomer is acrylic acid.

3. The binder composition of claim 2 wherein the amount of acrylic acid as copolymerized units is from 10 to 20% by weight based on the weight-of emulsion copolymer solids.

4. The binder composition of claim 3 wherein the polycarboxy emulsion copolymer has a measured Tg between 0 and 35° C.

5. The binder composition of claim 3 wherein the polycarboxy emulsion copolymer has a measured Tg between 35 and 70° C.

6. The binder composition of claim 1 wherein the extender is a water-soluble starch with a weight average molecular weight of less than 10,000.

7. The binder composition of claim 1 wherein the extender is a water-insoluble, starch with a weight average molecular weight of between 10,000 and 10,000,000.

8. The binder composition of claim 1 wherein the emulsion copolymer comprises acrylonitrile as copolymerized units.

9. The binder composition of claim 1, wherein the hydroxyamide crosslinker is one or more reactive β-hydroxyamide group-containing polyol of the following formula (I), which is the reaction product of a lactone or other cyclic ester and an alkanolamine:

in which formula, R and R" independently represent H, or any monovalent $C_1$ to $C_{18}$ linear or branched alkyl, which alkyl is chosen from one or two aryl or cycloalkyl groups, or is substituted with one or more hydroxyl, amine, thiol, amide, carboxyl or alkenyl groups, or combinations thereof; R' represents either a covalent bond or a divalent $C_1$ to $C_5$ alkylene radical where the alkylene radical may bear alkyl group substituents; y is the integer 1 or 2; x is 0 or 1, such that $(x+y)=2$.

10. The binder composition as claimed in claim 1, wherein the extender is present in the amount of 20 to 50 wt.%, based on total composition binder solids.

* * * * *